UNITED STATES PATENT OFFICE 2,732,393
Patented Jan. 24, 1956

2,732,393

SEPARATION OF POSITION ISOMERS

William B. Hardy, Bound Brook, N. J., assignor to American Cyanamid Company, New York, N. Y., a corporation of Maine No Drawing. Application March 5, 1953,
Serial No. 340,668

7 Claims. (Cl. 260—457)

This invention relates to the separation of isomeric aromatic compounds and more specifically it relates to new methods for separating the position isomers of di-substituted aromatic compounds having the following generic formula:

Y—Ar—Z in which Z is a reactive substituent selected from the class consisting of hydroxy and amino groups, Ar is a divalent aromatic nucleus containing at least one benzenoid ring and not more than two such rings, and Y is an inert substituent, such as an alkyl, cycloalkyl, aralkyl, aryl, acylamino, halogen or nitro group, the inert group Y being non-reactive with tertiary amine-sulfur trioxide compounds, wherein an ortho or a peri isomer of said di-substituted aromatic compounds is separated from the other position isomers thereof by certain chemical means in combination with physical means, all as more fully hereinafter described and claimed.

In particular, this invention comprises new and improved methods of so separating the position isomers of said di-substituted aromatic compounds from mixtures thereof containing a position isomer A having the groups Y and Z attached to adjacent, substituted ring carbons thereof, such as an ortho or peri isomer, and another position isomer B having the inert group Y attached to a ring carbon remote from the ring carbon attached to the reactive group Z thereof, wherein a mixture of said position isomers A and B is reacted with a tertiary amine-sulfur trioxide compound, in the presence of a solvent, to selectively convert the B isomer into a derivative thereof containing an $SO_3$ group and having markedly different properties, the said derivative of isomer B and the unreacted isomer A are separated from each other, the so separated isomer A is recovered as a substantially pure compound, the said derivative of isomer B is hydrolyzed to regenerate the isomer B and the so regenerated isomer B is recovered as a substantially pure compound, as is fully described and illustrated below.

As a class the di-substituted aromatic compounds having the formula given above, react with tertiary amine-sulfur trioxide compounds, in the presence of a solvent, to form derivatives thereof containing an $SO_3$ group and having properties markedly different from those of the original compound. In particular, those containing a reactive amino group are converted into a sulfamic acid derivative thereof. On the other hand, those containing a reactive hydroxyl group are converted into sulfuric acid ester derivatives thereof. In other words, the reaction of tertiary amine-sulfur trioxide with these di-substituted aromatic compounds converts them into other and different types of compounds, such as sulfamic and sulfuric acid derivatives thereof, all of which contain an $SO_3$ group.

As shown in U. S. Patent No. 2,402,647 to Lecher et al., tertiary amine-sulfur trioxide compounds have been previously used in the manufacture of sulfuric ester salts of phenols and reacted with phenol and certain substituted phenols and naphthols, in an alkaline medium as well as in an anhydrous organic solvent. However, the effectiveness and completeness of the esterification are materially different in the presence or absence of water with the various types of tertiary amine-sulfur trioxide compounds, as is pointed out in the patent.

It has now been found that the position of the substituent Y relative to the reactive group Z in the di-substituted aromatic compounds having the generic formula given above, also materially affects the reaction of such compounds with tertiary amine-sulfur trioxide compounds, particularly as to the rate of reaction and the completeness thereof. In particular, it has been found that the position isomers in which the group Y and the reactive group Z are attached to adjacent, substituted ring carbons thereof, such as the ortho or peri isomers, react at a slower rate than the other position isomer in which the inert group Y is attached to a ring carbon remote from the ring carbon attached to the reactive group Z thereof. These differences in the reaction rates of such position isomers were discovered in reacting tertiary amine-sulfur trioxide compounds with mixtures of such position isomer containing equimolecular amounts of the position isomers A and B. In doing so, it was found the B isomers were selectively converted into derivatives thereof containing a $SO_3$ group whereas the A isomers remained in a substantially unreacted condition; the reaction products so obtained being mixtures of unreacted isomer A and the derivatives of isomer B containing a $SO_3$ group.

In the new methods of this invention wherein such position isomers A and B are separated from mixtures thereof and are separately recovered as substantially pure compounds, the several discoveries made relative to the results obtained in reacting these mixtures with tertiary amine-sulfur trioxide compounds, as set forth ante, are applied and used with advantage in such methods; this particular reaction being one of the chemical means employed therein.

In particular, in the first step of these methods, the B isomer is selectively converted, in situ, by such chemical means into a different type of chemical compound which can be more readily and effectively separated from the A isomer admixed therewith. For instance, the B isomers of the compounds containing a reactive amino group as the substituent Z are converted into the sulfamic acid derivatives thereof and the solubility of such sulfamic acid compounds in organic solvents are markedly different from those of the original amine compounds. On the other hand, the B isomers containing a reactive hydroxy group as the substituent Z are converted into water-soluble sulfuric acid ester derivatives thereof and the solubilities thereof are markedly different from those of the original hydroxy compounds. For example, the sodium salts of the sulfamic acids or the sulfuric esters are generally soluble in water as opposed to the amines or phenols from which they are derived which generally are insoluble in water. Thus, such derivatives of the B isomers containing a $SO_3$ group can be readily separated from the unreacted A isomers by various physical means according to the specific differences in the solubilities and other physical properties thereof.

In this selective conversion of the B isomers, in situ, into such derivatives thereof, the mixture of isomers A and B is reacted with the tertiary amine-sulfur trioxide compound in the presence of a solvent which may be either an organic solvent or an alkaline aqueous solvent. In most cases, the desired selective conversion can be obtained at room temperatures. Also, the reaction and conversion may be effected at moderately elevated temperatures as required or desired. A temperature range of 5° to 60° is preferred. In general, the temperature required for this selective conversion of the B isomers, varies somewhat with the type of tertiary amine-sulfur trioxide compound employed. For instance, this selective conversion can be readily effected in both an organic solvent and in an alkaline aqueous medium, using the addition products of sulfur trioxide and tertiary alkyl amines, such as trimethylamine, triethylamine, the tripropylamines and the tributylamines; such compounds having several advantages for the present purposes. Also, the addition products of sulfur trioxide and other strongly basic tertiary amines having a dissociation constant of at least $1 \times 10^{-7}$ at $25°$ C., such as those set forth in Patent 2,402,647 to Lecher et al., may be used with advantage in this selective conversion of the B isomers, in situ. Further, when the selective conversion is effected in an organic solvent, addition products of sulfur trioxide with aromatic tertiary amines, such as pyridine, may be employed. In doing so, various organic solvents may be used, such as pyridine, acetone, ether, dioxane, benzene, toluene and like solvents. Other suitable organic solvents are chloroform, ethylene dichloride, chlorobenzene and like chlorinated solvents. In general, the selection of the organic solvent depends upon the particular B isomer being so converted and the teriary amine-sulfur trioxide compound used, they being so correlated as to produce a reaction mixture from which the derivative thereof and the unreacted A isomer can be readily separated. Also, in most cases the selective conversion of the B isomer, in situ, can be effected with advantage in alkaline aqueous medium and the tertiary amine-sulfur trioxide compound is selected accordingly.

In separating the mixtures of the derivatives of the B isomer and unreacted A isomer so obtained, various procedures may be employed, as illustrated in the specific examples given below. For instance, when the B isomer is converted into a derivative thereof which is insoluble in the organic solvent employed, it can be separated by filtration, as illustrated in Example 3 below. On the other hand, when the conversion is effected in an aqueous medium and the B isomer is converted into a water-soluble derivative thereof, the unreacted isomer A may be separated by extracting the aqueous reaction products with an immiscible organic solvent for the same, such as ether, etc. Likewise, the unreacted isomer A and the derivative of the B isomer may be partitioned between other pairs of immiscible solvents for the same. The solvent layers so obtained can be separated and the so separated compounds dissolved therein recovered from each of the layers.

After the unreacted A isomer has been separated therefrom, the said derivatives of the B isomers containing a $SO_3$ group are then regenerated by hydrolysis to obtain the original isomer B. They can be readily hydrolyzed and regenerated with aqueous acids. In doing so, dilute aqueous solutions of hydrochloric, hydrobromic, sulfuric and phosphoric acids may be used. The so regenerated B isomer can be recovered from such aqueous acids in various ways. In general, they are insoluble in aqueous solutions and hence can be recovered by filtration or crystallization.

That is, in these multi-step methods for separating the position isomers A and B from mixtures thereof, using both chemical and physical means to separate and recover both isomers A and B as substantially pure compounds, there is a wide choice of means in each step thereof by which the problems and difficulties encountered in separating particular mixtures thereof can be readily met and overcome in the practice of the same. Thus, mixtures of position isomers A and B of a wide variety of di-substituted aromatic compounds having the generic formula given ante, can be readily separated by the basic method of this invention.

In particular, the ortho isomers of mono-substituted phenols and anilines containing said inert substituent Y can be readily separated from the para and meta isomers thereof. Generically, these mono-substituted phenols and anilines may be represented by the following formula:

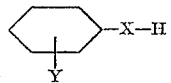

in which X is a divalent substituent selected from the class consisting of —O— and —NH— and Y is the inert substituent thereof. For instance ortho-phenylphenol can be readily separated from para-phenylphenol, as shown in Example 1. Also, as shown in Example 3, orthoethylaniline can be readily separated from para-ethylaniline.

Likewise, the peri isomers of acylamino naphthols and other mono-substituted naphthols containing an inert substituent Y can be readily separated from the other position isomers thereof by the methods of this invention. For instance, 8-benzamido-1-naphthol can be readily separated from 5-benzamido-1-naphthol, as shown in Example 2 below. In the peri isomers of such substituted naphthols, the reactive group Z and the inert group Y are attached adjacent, substituted ring carbons of the naphthalene nucleus; they being attached to the naphthalene ring in the 1,8 positions, respectively.

This invention will be described in greater detail in conjunction with the following illustrative examples in which the parts are parts by weight unless otherwise specified.

*Example 1*

17.0 parts of an equimolecular mixture of ortho-phenylphenol and para-phenylphenol (8.5 parts of each) are dissolved at 70° C. in a solution of 4.4 parts of sodium hydroxide in 58 parts of water. 9.2 parts of sodium bicarbonate and 13.8 parts of triethylamine-sulfur trioxide are added. The reaction mixture is stirred at 35–50° C. until the reaction is substantially complete, about 3.5 hours being required.

The reaction mixture so obtained is extracted with ether and the ether layer separated from the lower aqueous layer. The unreacted ortho-phenylphenol is recovered from the ether layer by distilling off the ether.

The aqueous layer is diluted to 125 parts with water and 30 parts by volume of 20% sodium hydroxide are added thereto. Sodium chloride is added to the so diluted solution to salt out the sulfuric ester of para-phenylphenol and the precipitated sulfuric ester is recovered by filtration. The so-recovered sulfuric ester of para-phenylphenol is obtained in about 81% yield and is a substantially pure product. In turn, pure para-phenylphenol is recovered from the said sulfuric ester thereof by hydrolyzing the sulfuric ester in aqueous acid solution at temperatures of 50–100° or above and filtering off the insoluble para-phenylphenol so obtained. The so-recovered para-phenylphenol had a melting point of 163–164° C. and is a substantially pure product. It is obtained in high yield.

*Example 2*

2.6 parts of an equimolecular mixture of 5-benzamido-1-naphthol and 8-benzamido-1-naphthol (1.3 parts of each) are dissolved in 15 parts of pyridine and one part of triethylamine-sulfur trioxide is added. The solution is allowed to stand at room temperature until the reaction is substantially complete about 24 hours being required.

The reaction mixture so obtained is diluted with 10 parts of water and 5 parts of 20% sodium hydroxide are added thereto. The so diluted mixture is extracted with ether to remove the by-product triethylamine and the ether layer is separated from the aqueous layer.

The aqueous layer is made faintly acid with acetic acid and again extracted with ether to remove the unreacted 8-benzamido-1-naphthol and the ether layer is separated from the aqueous layer so obtained. The 8-benzamido-1-naphthol is recovered from this ether layer by evaporating off the ether therefrom.

The aqueous layer from the second extraction is acidified with hydrochloric acid and the acid solution so obtained is boiled to hydrolyze the sulfuric ester of the 5-benzamido-1-naphthol and to liberate the 5-benzamido-1-naphthol therefrom. The so liberated 5-benzamido-1-naphthol is recovered from said acid solution by filtration. A yield of about 53% of substantially pure 5-benzamido-1-naphthol is obtained.

*Example 3*

24.2 parts of an equimolecular mixture of ortho-ethylaniline and para-ethylaniline (12.1 parts of each) are dissolved in 100 parts of chloroform. 20.2 parts triethylamine sulfur trioxide are added. The reaction mixture is slowly heated to about 25° C. and stirred until the reaction is substantially complete, about 5 hours heating being required.

The reaction mixture so obtained is cooled to 7° C. and filtered to separate the triethylammonium salt of paraethylaniline sulfamic acid. This solid salt is washed with hexane and dried. The dried salt is a substantially pure compound having a melting point of 101–103° C. This pure salt is obtained in about 64.2% yield. In turn, pure para-ethylaniline can be regenerated from this pure salt by hydrolyzing said salt in aqueous acid and recovering the paraethylaniline from said solution.

The unreacted ortho-ethylaniline is recovered from the chloroform filtrate by evaporating the chloroform.

The above examples are merely illustrative of the methods and procedures used in the present invention and are not limitative thereof. For instance, in lieu of the triethylamine-sulfur trioxide used therein, the addition products of $SO_3$ and other tertiary alkylamines may be employed. In general, the addition products of $SO_3$ and strongly basic tertiary amine having a dissociation constant of at least $1 \times 10^{-7}$ at 25° C. are effective and useful in such methods. Likewise, other organic solvents may be used in lieu of those specified in the above examples. Further, the methods and procedures used in said examples may also be used in separating the position isomer A and B of similar types of di-substituted aromatic compounds having the generic formula given ante.

What I claim is:

1. As a new method of separating the position isomers of a di-substituted aromatic compound having the following formula:

Y—Ar—Z in which Z is a reactive substituent selected from the class consisting of hydroxy and amino groups, Ar is a divalent aromatic nucleus containing at least one benzenoid ring and not more than two such rings, and Y is an inert substituent non-reactive with tertiary amine-sulfur trioxide compounds, from mixtures thereof containing a position isomer A having the groups Y and Z attached to adjacent, substituted ring carbons thereof and another position isomer B having the inert group Y attached to a ring carbon remote from the ring carbon attached to the reactive group Z thereof, the improved method which comprises reacting a mixture of said position isomers A and B with a tertiary amine-sulfur trioxide compound, in the presence of a solvent, to selectively convert the B isomer into a derivative thereof containing a $SO_3$ group and having markedly different properties, separating the said derivative of isomer B from the unreacted isomer A, recovering the so-separated isomer A as a substantially pure compound, hydrolyzing the said derivative of isomer B to regenerate the isomer B and recovering the so regenerated isomer B as a substantially pure compound.

2. The method of claim 1 in which the tertiary amine-sulfur trioxide compound is triethylamine-sulfur trioxide.

3. The method of claim 1 in which the A and B isomers are ortho-phenylphenol and para-phenylphenol.

4. The process of claim 1 in which the isomers A and B are ortho-ethylaniline and para-ethylaniline.

5. The process according to claim 1 in which the A and B isomers are 1,8-benzamidonaphthol and 1,5-benzamidonaphthol.

6. In a method of separating the position isomers of a di-substituted aromatic compound having the following formula:

Y—Ar—Z in which Z is a reactive substitutent selected from the class consisting of hydroxy and amino groups, Ar is a divalent aromatic nucleus containing at least one benzenoid ring and not more than two such rings, Y is an inert substituent non-reactive with tertiary amine-sulfur trioxide compounds, from mixtures thereof containing a position isomer A having the groups Y and Z attached to adjacent, substituted ring carbons thereof and another position isomer B having the inert group Y attached to a ring carbon remote from the ring carbon attached to the reactive group Z thereof, the steps which comprise reacting a mixture of said position isomers A and B with a tertiary amine-sulfur trioxide compound to selectively convert the B isomer into a derivative thereof containing a $SO_3$ group and having markedly different properties, and separating the said derivative of isomer B from the unreacted isomer A.

7. The method of claim 6 in which the mixture of position isomers A and B is a mixture of ortho-phenylphenol and para-phenylphenol and the said tertiary amine-sulphur trioxide compound is triethylamine-sulphur trioxide.

References Cited in the file of this patent

UNITED STATES PATENTS 2,402,647   Lecher et al. _____ June 25, 1946

OTHER REFERENCES

Hardy et al.: J. A. C. S., vol. 74, pp. 5212–5214 (Oct. 1952).